United States Patent
Nishimura et al.

(10) Patent No.: US 11,552,462 B2
(45) Date of Patent: Jan. 10, 2023

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Motohiro Yokoi, Mie (JP); Kenta Ito, Mie (JP); Haruka Nakano, Mie (JP); Masaki Mizushita, Mie (JP); Ryusuke Kudo, Mie (JP); Kenta Arai, Mie (JP); Hidetoshi Ishida, Mie (JP); Daisuke Ebata, Mie (JP); Yasuyuki Yamamoto, Mie (JP); Suguru Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/311,501

(22) PCT Filed: Dec. 12, 2019

(86) PCT No.: PCT/JP2019/048690
§ 371 (c)(1),
(2) Date: Jun. 7, 2021

(87) PCT Pub. No.: WO2020/122177
PCT Pub. Date: Jun. 18, 2020

(65) Prior Publication Data
US 2022/0014002 A1    Jan. 13, 2022

(30) Foreign Application Priority Data
Dec. 12, 2018   (WO) .................. PCT/JP2018/045654

(51) Int. Cl.
  *H02G 3/04*   (2006.01)
  *B60R 16/02*  (2006.01)
  *H02G 3/30*   (2006.01)

(52) U.S. Cl.
  CPC ....... *H02G 3/0437* (2013.01); *B60R 16/0215* (2013.01); *H02G 3/30* (2013.01)

(58) Field of Classification Search
  CPC .... H01B 7/009; H01B 7/0846; H01B 7/0823; H01B 7/0838; H01B 7/04;
  (Continued)

(56) References Cited

U.S. PATENT DOCUMENTS 3,819,848 A * 6/1974 Fry ...................... H01B 7/0846
                                                       174/72 A
3,898,371 A * 8/1975 Bridgett ............... H01B 7/0846
                                                       174/72 A
(Continued)

FOREIGN PATENT DOCUMENTS

CN     107148372     9/2017
CN     107431339     12/2017
(Continued)

OTHER PUBLICATIONS

U.S. Appl. No. 17/296,666, filed May 25, 2021.
(Continued)

*Primary Examiner* — Krystal Robinson
(74) *Attorney, Agent, or Firm* — Greenblum & Bernstein, P.L.C.

(57) ABSTRACT

A wiring member includes a sheet-shaped member and multiple linear transmission members that are fixed on the sheet-shaped member. The plurality of linear transmission members are fixed on the sheet-shaped member such that a portion of the plurality of linear transmission members branches with respect to another said linear transmission
(Continued)

member at a branching portion. An intersection location of the plurality of linear transmission members is located at the branching portion.

16 Claims, 7 Drawing Sheets

(58) Field of Classification Search
CPC ............ H01B 13/01254; H01B 13/012; H01B 7/0045; H01B 7/40; H01B 13/01209; H01B 7/08; H01B 7/282; H01B 7/2825; H01B 13/0013; H01B 7/00; H01B 7/02; H01B 7/18; H01B 7/0009; H01B 7/285; H01B 13/0006; H01B 13/003; H01B 13/01263; H01B 13/01281; H01B 13/06; H01B 13/16; H01B 17/26; H01B 17/56; H01B 3/44; H01B 7/041; H01B 7/17; H01B 13/0036; H01B 13/008; H01B 17/50; H01B 17/66; H01B 19/00; H01B 19/02; H01B 3/28; H01B 3/441; H01B 3/443; H01B 3/445; H01B 7/0216; H01B 7/0275; H01B 7/0815; H01B 7/0861; H01B 7/0876; H01B 7/36; H02G 3/0437; H02G 3/30; H02G 3/266; H02G 3/305; H02G 3/32; H02G 3/34; H02G 15/003; H02G 15/18; H02G 3/0462; H02G 11/006; H02G 3/0406; H02G 3/0481; H02G 3/0487; H02G 3/36; H02G 3/0418; H02G 1/00; H02G 1/06; H02G 1/14; H02G 15/043; H02G 15/076; H02G 15/08; H02G 15/1813; H02G 3/00; H02G 3/0468; H02G 3/22; H02G 3/26; H02G 3/383; H02G 3/04; H02G 3/045; H02G 3/0456; H02G 3/105; H02G 3/24; H02G 3/263; B60R 16/0215; B60R 16/0207; H02B 1/20
USPC ...................................................... 174/72 A
See application file for complete search history.

(56) References Cited

U.S. PATENT DOCUMENTS

| | | | | | |
|---|---|---|---|---|---|
| 3,960,430 | A | * | 6/1976 | Bunnell | H01R 4/2495 439/422 |
| 4,000,558 | A | * | 1/1977 | Cahill | H01B 7/0838 29/850 |
| 4,065,199 | A | * | 12/1977 | Andre | H01B 7/08 174/72 A |
| 4,717,357 | A | * | 1/1988 | Greenwood | H01R 12/616 439/492 |
| 4,874,908 | A | * | 10/1989 | Johansson | H02B 1/202 439/402 |
| 5,276,759 | A | * | 1/1994 | Nguyen | G02B 6/4403 174/121 R |
| 5,534,665 | A | * | 7/1996 | Long | B60R 16/0215 174/72 A |
| 6,702,607 | B2 | * | 3/2004 | Kondo | B60R 16/0207 174/72 A |
| 10,867,721 | B2 | | 12/2020 | Ishida et al. | |
| 2002/0096358 | A1 | * | 7/2002 | Murakami | H01B 11/1091 174/251 |
| 2002/0111048 | A1 | * | 8/2002 | Kondoh | B60R 16/0207 439/34 |
| 2014/0204544 | A1 | | 7/2014 | Tanaka et al. | |
| 2017/0313266 | A1 | | 11/2017 | Mizuno et al. | |
| 2018/0114612 | A1 | | 4/2018 | Itani et al. | |
| 2020/0062198 | A1 | | 2/2020 | Mizushita et al. | |

FOREIGN PATENT DOCUMENTS

| | | | | |
|---|---|---|---|---|
| DE | 2344948 | A | * 3/1974 | ........... H01B 7/0045 |
| JP | 49-67196 | | 6/1974 | |
| JP | S58-168010 | A | 10/1983 | |
| JP | 62-40104 | | 2/1987 | |
| JP | S62-256492 | A | 11/1987 | |
| JP | 64-10509 | | 1/1989 | |
| JP | H04-248209 | A | 9/1992 | |
| JP | 2002-267852 | A | 9/2002 | |
| JP | 2004-116303 | | 4/2004 | |
| JP | 2005-322523 | | 11/2005 | |
| JP | 2014-143079 | A | 8/2014 | |
| JP | 2016-015852 | A | 1/2016 | |
| JP | 2018-137208 | A | 8/2018 | |
| WO | 2018/207695 | A1 | 11/2018 | |

OTHER PUBLICATIONS

U.S. Appl. No. 17/296,694, filed May 25, 2021.
U.S. Appl. No. 17/312,241, filed Jun. 9, 2021, Nishimura et al.
International Search Report, WIPO, Application No. PCT/JP2018/045654, dated Jan. 22, 2019, with English translation.
International Search Report, WIPO, Application No. PCT/JP2019/048690, dated Mar. 3, 2020, with English translation.
International Preliminary Report on Patentability, WIPO, Application No. PCT/JP2019/048690, dated Jan. 27, 2021, with English translation.
Office Action, Japan Patent Office, in counterpart Japanese Patent Application No. 2020-559600, dated Apr. 5, 2022 (with English translation).
Office Action, China Patent Office, in counterpart Chinese Application No. 201980081626.0, dated Mar. 17, 2022, (with English translation).
Office Action, Japan Patent Office, in counterpart Japanese Application No. 2020-559312, dated May 24, 2022, (with English translation).
Office Action, in counterpart Japanese Patent Application No. 2020-559600, dated Sep. 6, 2022, with English translation.
Office Action, Japan Patent Office, in counterpart Japanese Patent Application No. 2020-559312, dated Sep. 27, 2022 (with English translation).
Office Action, China Patent Office, in counterpart Chinese Patent Application No. 201980081626.0, dated Nov. 3, 2022 (with English translation).

* cited by examiner

F I G. 5
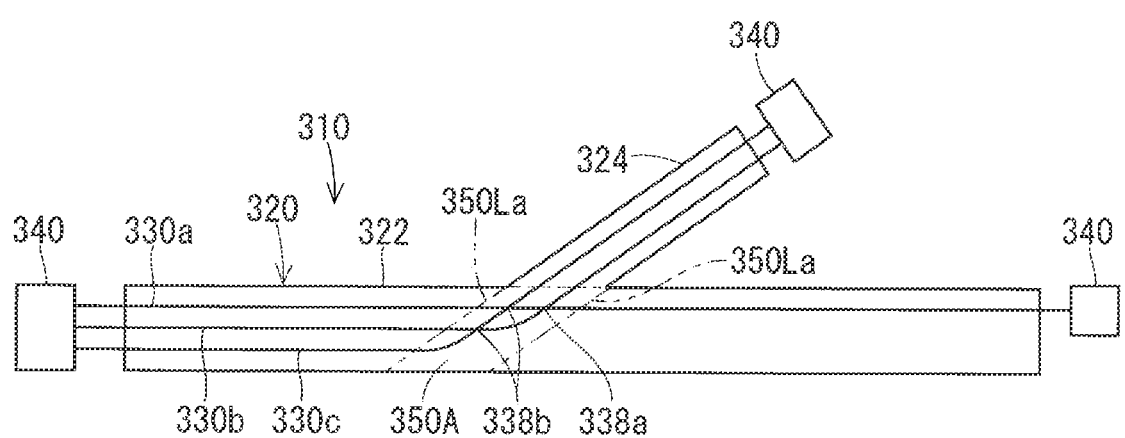

F I G. 7
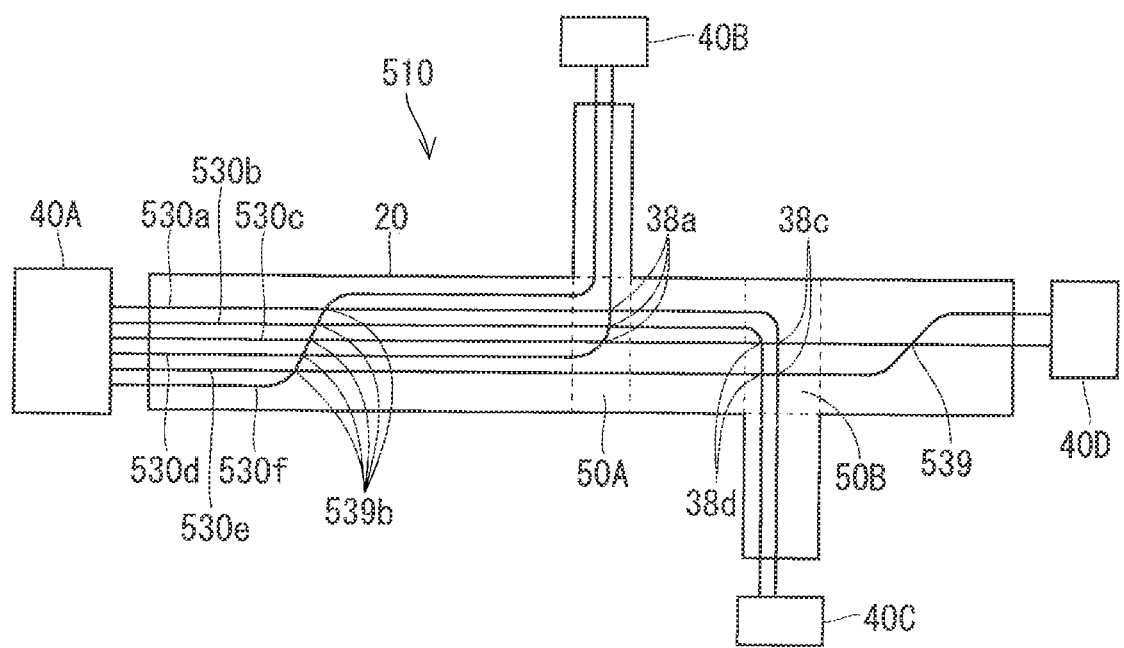

WIRING MEMBER

TECHNICAL FIELD

The present invention relates to a ring member.

BACKGROUND ART

Patent Document 1 discloses a wire harness including a functional outer covering member formed into a sheet shape, and wires disposed so as to overlap with the functional outer covering member in at least a partial region along a lengthwise direction, in which at least part of the portion at which insulating coverings of the wires and the functional outer covering member overlap with each other is welded.

CITATION LIST

Patent Documents

Patent Document 1: JP 2018-137208A

SUMMARY OF INVENTION

Technical Problem

The wire harness disclosed in Patent Document 1 can be made into a compact form by folding the functional outer covering member formed into a sheet shape during packaging, transport, or the like.

However, if the wire harness is folded, there is a risk that the paths of the wires will be disturbed on the functional outer covering member and separation will occur. For example, with the wire harness disclosed in Patent Document 1, a case is possible in which, according to the paths of the wires, the positions at which the wires are connected to the connector, and the like, one of the wires is disposed intersecting so as to span over another wire on the sheet-shaped function outer covering member. The holding force of the wire spanning over the other wire weakens at the wire intersection portion. For this reason, if the functional outer covering member is folded at the wire intersection portion, there is a risk that the paths of the wires will be disturbed on the functional outer covering member or separation will occur.

In view of this, the present disclosure aims to suppress a case in which paths of linear transmission members are disturbed on a sheet-shaped member or the linear transmission members separate from the sheet-shaped member when a wiring member obtained by fixing the linear transmission members on the sheet-shaped member is folded.

Solution to Problem

A wiring member according to the present disclosure includes: a sheet-shaped member; and a plurality of linear transmission members fixed on the sheet-shaped member, in which the plurality of linear transmission members are fixed on the sheet-shaped member such that a portion of the plurality of linear transmission members branches with respect to the other linear transmission members at a branching portion, and an intersection location of the plurality of linear transmission members is located at the branching portion.

The wiring member according to the present disclosure includes: a sheet-shaped member; and a plurality of linear transmission members fixed on the sheet-shaped member, in which a portion of the plurality of linear transmission members is fixed on the sheet-shaped member so as to branch with respect to another said linear transmission member at a branching portion, and a location at which a portion of the plurality of linear transmission members intersects another said linear transmission member such that, an alignment sequence of the plurality of linear transmission members is changed is located at the branching portion.

Advantageous Effects of Disclosure

According to the present disclosure, a case is suppressed in which the paths of the linear transmission members are disturbed on the sheet-shaped member or the linear transmission members separate from the sheet-shaped member when a wiring member obtained by fixing the linear transmission members on the sheet-shaped member is folded.

BRIEF DESCRIPTION OF DRAWINGS

FIG. 5 is an overall plan view showing a wiring member according to a third variation.

FIG. 7 is an overall plan view showing a wiring member according to a fifth variation.

DESCRIPTION OF EMBODIMENTS

Figure 1:
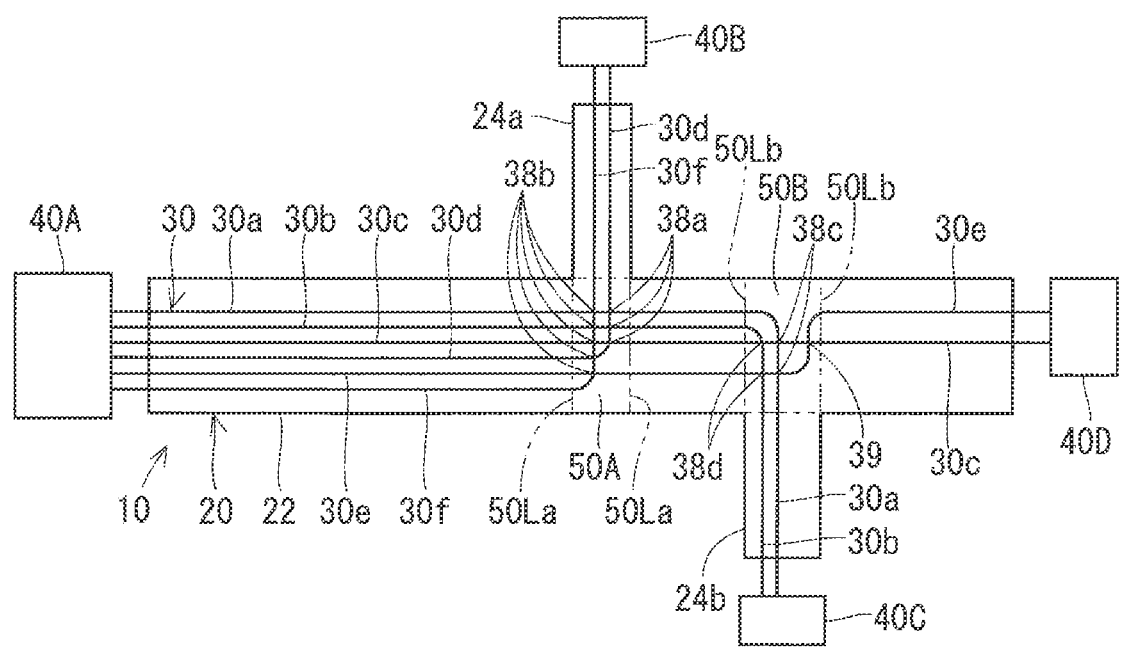
FIG. 1 is an overall plan view showing a wiring member according to an embodiment.

[Description of Embodiments According to the Present Disclosure]

Embodiments according to the present disclosure are listed and described firstly.

A wiring member according to the present disclosure is as follows.

(1) A wiring member includes: a sheet-shaped member; and multiple linear transmission members fixed on the sheet-shaped member, in which the multiple linear transmission members are fixed on the sheet-shaped member such that a portion of the multiple linear transmission members branches with respect to the other linear transmission members at a branching portion, and an intersection location of the multiple linear transmission members is located at the branching portion.

Normally, a wiring member is folded at a position away from a branching portion and is packaged, transported, or the like. In view of this, by using a configuration in which an intersection location of multiple linear transmission members is located at the branching portion as in the first aspect, a case is suppressed in which the paths of the linear transmission members are disturbed on the sheet-shaped member or the linear transmission members separate from the sheet-shaped member when the wiring member obtained by fixing the linear transmission members on the sheet-shaped member is folded.

(2) In the wiring member according to (1), an intersection location of multiple linear transmission members may be located at only the branching portion. A case is suppressed in which the paths of the linear transmission members are disturbed on the sheet-shaped member or the linear transmission members separate from the sheet-shaped member.

(3) In the wiring member according to (1) or (2), the intersection location may include a location at which a portion of the multiple linear transmission members intersects so as to branch with respect to the other linear transmission member. Due to the location at which a portion of the multiple linear transmission members intersect so as to branch with respect to the other linear transmission member being located at the branching portion, a case is suppressed in which the paths of the linear transmission members are disturbed on the sheet-shaped member or the linear transmission member separate from the sheet-shaped member when the wiring member obtained by fixing the linear transmission members on the sheet-shaped member is folded.

(4) in the wiring ember according to any one of (1) to (3), the intersection location may include a location at which a portion of the multiple linear transmission members intersects the other linear transmission member such that an alignment sequence of the multiple linear transmission members is changed.

The location at which a portion of the multiple linear transmission members intersects with the other linear transmission member such that the alignment sequence of the multiple linear transmission members is changed is located at the branching portion, and thereby a case is suppressed in which the paths of the linear transmission members are disturbed on the sheet-shaped member or the linear transmission members separate from the sheet-shaped member when the wiring member obtained by fixing the linear transmission members on the sheet-shaped member is folded.

(5) In the wiring member according to any one of (1) to (4), it is also applicable that the sheet-shaped member includes a first sheet-shaped portion, and a second sheet-shaped portion that branches from the first sheet-shaped portion, a portion of the multiple linear transmission members branches with respect to the other linear transmission member at the first sheet-shaped portion and is fixed on the second sheet-shaped portion, and the branching portion includes a region extending from the second sheet-shaped portion to the first sheet-shaped portion. If the sheet-shaped member includes the first sheet-shaped portion and the second sheet-shaped portion that branches from the first sheet-shaped portion, normally, there are fewer folding locations of the sheet-shaped member, and therefore the first sheet-shaped member can be folded at a position away from the second sheet-shaped portion. For this reason, if the branching portion includes a region extending from the second sheet-shaped portion to the first sheet-shaped portion, it is possible to suppress a case in which the sheet-shaped member is folded at the intersection location of the multiple linear transmission members when the sheet-shaped member is folded.

(6) In the wiring member according to any one of (1) to (5), it is also applicable that multiple linear transmission members, which are a portion of the multiple linear transmission members, branch with respect to the other linear transmission member on the sheet-shaped member, and are connected to a connector provided on a side edge of the sheet-shaped member, and the branching portion includes a region of the sheet-shaped member that corresponds to the connector. If a portion of the multiple linear transmission members branches with respect to the other linear transmission members on the sheet-shaped member as in the fifth aspect, normally, the sheet-shaped member is folded at a position away from the branched portions of the branching linear transmission members in order to suppress folding of the branched portions of the branching linear transmission members. For this reason, if the branching portion includes a region extending from the branching linear transmission member to the sheet-shaped member, it is possible to suppress a case in which the sheet-shaped member is folded at the intersection location of the plurality of linear transmission members when the sheet-shaped member is folded.

(7) In the wiring member according to any one of (1) to (6), it is also applicable that multiple linear transmission members, which are a portion of the multiple linear transmission members, branch with respect to the other linear transmission member on the sheet-shaped member, and are connected to a connector provided on a side edge of the sheet-shaped member, and the branching portion includes a region of the sheet-shaped member that corresponds to the connector. If multiple linear transmission members, which are a portion of the multiple linear transmission members, branch with respect to the other linear transmission members on the sheet-shaped member and are connected to a connector provided on the side edge of the sheet-shaped member, normally, the wiring member can be folded at a position away from the connector. For this reason, if the branching portion includes a region of the sheet-shaped member that corresponds to the connector, it is possible to suppress a case in which the sheet-shaped member is folded at the intersection location of the multiple linear transmission members when the sheet-shaped member is folded.

(8) The wiring member according to any one of (1) to (7) may further include a cover that covers the branching portion. At the intersection location located at the branching portion, due to the cover, a case is further suppressed in which the paths of the linear transmission members are disturbed on the sheet-shaped member or the linear transmission members separate from the sheet-shaped member.

(9) A wiring member includes: a sheet-shaped member; and multiple linear transmission members fixed on the sheet-shaped member, wherein a portion of the multiple linear transmission members is fixed on the sheet-shaped member so as to branch with respect to the other linear transmission member at a branching portion, and a location at which a portion of the multiple linear transmission members intersects the other linear transmission member such that an alignment sequence of the multiple linear transmission members is changed is located at the branching portion. At the location at which a portion of the multiple linear transmission members intersects the other linear transmission member such that the alignment sequence of the multiple linear transmission members is changed, a case is suppressed in which the paths of the linear transmission members are disturbed on the sheet-shaped member or the linear transmission members separate from the sheet-shaped member.

[Details of Embodiments According to the Present Disclosure]

A specific example of a wiring member according to the present disclosure is described hereinafter with reference to the drawings. The present disclosure is not limited to these examples, but is indicated by claims, and it is intended that meanings equivalent to claims and all modifications within a scope of claims are included.

Embodiment 1

Figure 2:
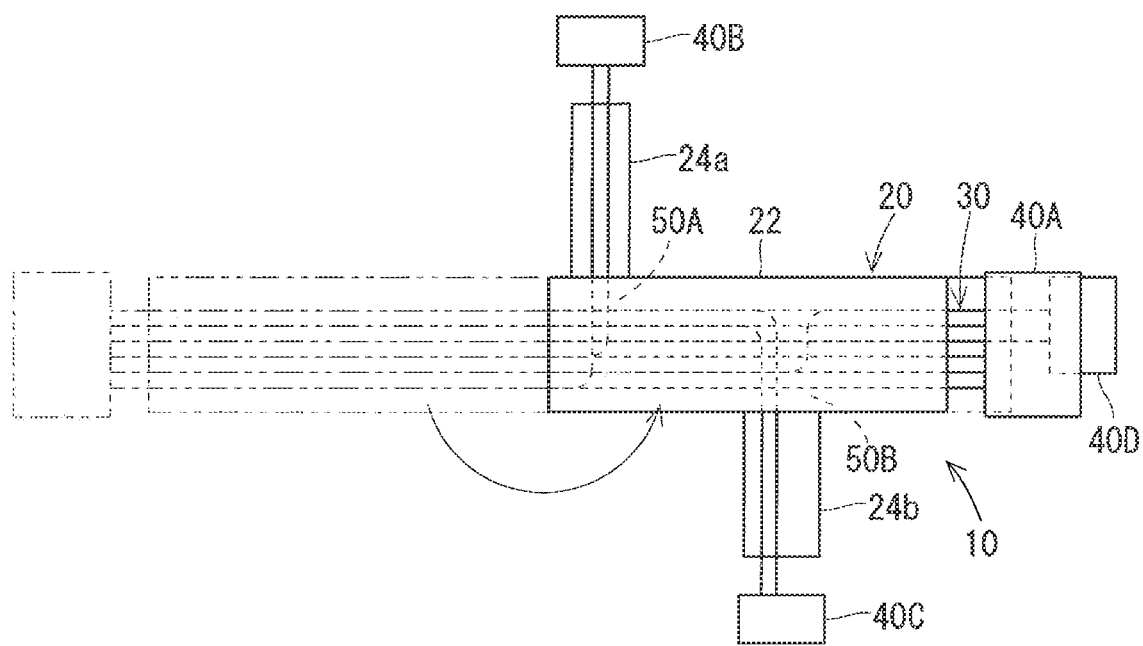
FIG. 2 is an overall plate view showing a state in which the wiring member has been folded up.

Hereinafter, a wiring member according to an embodiment will be described, FIG. 1 is an overall plan view showing a wiring member 10, and FIG. 2 is an overall plan view showing a state in which the wiring member 10 has been folded up.

The wiring member 10 includes a sheet-shaped member 20 and multiple linear transmission members 30. In the present example, the wiring member 10 also includes connectors 40A, 40B, 40C, and 40D.

The linear transmission member 30 is a linear member that transmits electricity or light. The sheet-shaped member 20 is a member in the form of a sheet. The multiple linear transmission members 30 are fixed on the sheet-shaped member 20. A portion of the multiple linear transmission members 30 is fixed on the sheet-shaped member 20 so as to branch at branching portions 50A and 50B with respect to the other linear transmission members 30. The branching portions 50A and 50B are regions at which it is understood that the linear transmission members 30 have branched in an overall view of the wiring member 10. Multiple linear transmission members 30 intersect on the sheet-shaped member 20, and intersection locations 38a, 38b, 38c, and 38d are located at only the branching portions 50A and 50B.

The connectors 40A, 40B, 40C, and 40D are components that are to be connected to components mounted in a vehicle. The end portions of the multiple linear transmission members 30 are each connected to one of the connectors 40A, 40B, 40C, and 40D. Due to the connectors 40A, 40B, 40C, and 40D being connected to the partner-side connectors mounted in the vehicle, the linear transmission members 30 and the corresponding components are electrically connected or are connected so as to be able to transmit and receive optical signals.

In a state in which the wiring member 10 is mounted in the vehicle, the multiple connectors 40A, 40B, 40C, and 40D are connected to respective components mounted in the vehicle. Accordingly, transmission and reception of electrical signals, transmission and reception of electricity, and transmission and reception of optical signals are performed between the components mounted in the vehicle. That is, the wiring member 10 is a wiring component that connects components mounted in the vehicle. In particular, in the wiring member 10, due to the fact that the multiple linear transmission members 30 branch, it is possible to connect multiple components via a branched route.

The portions will be described more specifically.

The linear transmission member 30 need only be a linear member that transmits electricity, light, or the like. For example, the linear transmission member may be a common wire having a core wire and a covering around the core wire, and may also be a bare conductive wire, a shielded wire, an enamel wire, a nichrome wire, an optical fiber, or the like.

Various types of signal lines and various types of power lines may also be used as a linear transmission member that transmits electricity. A linear transmission member that transmits electricity may also be used as an antenna, a coil, or the like that sends signals or electricity to a space or receives signals or electricity from a space.

Here, description will be given assuming that the linear transmission member 30 is a common wire 30 (hereinafter simply referred to as a wire 30). The wire 30 includes a core wire serving as a transmission wire main body and an insulating covering serving as a covering that covers the core wire. The descriptions relating to the wire can be applied to each illustrated object of the linear transmission member, except for configurations to which they cannot be applied.

The core wire is constituted by one or multiple strands. The strand is constituted by a conductor such as copper, a copper alloy, aluminum, or an aluminum alloy. If the core wire is constituted by multiple strands, the multiple strands may also be twisted. The insulating covering is formed due to a resin material such as PVC (polyvinyl chloride) or PE (polyethylene) being extrusion molded around the core wire or the like. Here, the wire 30 is a so-called round wire with a circular transverse cross section.

The sheet-shaped member 20 is a flexible sheet-shaped member that can hold the wires 30 in a state of being positioned two-dimensionally, and that can be folded.

Although there is no particular limitation on the material constituting the sheet-shaped member 20, the sheet-shaped member 20 is preferably constituted by a material including a resin such as PVC (polyvinyl chloride), PET (polyethylene terephthalate), or PP (polypropylene). The sheet-shaped member 20 may also be a sheet member in which the interior is uniformly embedded, nonwoven sheet, or the like. The sheet-shaped member 20 can also include material such as a metal. The sheet-shaped member 20 may also be a single layer, or multiple layers may be stacked. If multiple layers are stacked, for example, it is conceivable that resin layers are stacked. Also, for example, it is conceivable that a resin layer and a metal layer are stacked.

The wires 30 are fixed on one main surface of the sheet-shaped member 20. The wires 30 are fixed along a certain path on the one main surface of the sheet-shaped member 20.

Multiple wires 30 are fixed on the one main surface of the sheet-shaped member 20. The paths of the wires 30 on the sheet-shaped member 20 may be linear or may be paths that bend at an intermediate location. The multiple wires 30 branch at an intermediate location on the one main surface of the sheet-shaped member 20.

More specifically, the sheet-shaped member 20 includes a first sheet-shaped portion 22 and second sheet-shaped portions 24a and 24b. The second sheet-shaped portions 24a and 24b bend at intermediate portions in the extension direction of the first sheet-shaped portion 22 and branch to the sides of the first sheet-shaped portion 22. Here, the first sheet-shaped portion 22 is formed into a band shape that is elongated and extends straight. The first sheet-shaped portion may also be bent. The second sheet-shaped portions 24a and 24b are formed into band shapes that are elongated and extend straight. The second sheet-shaped portion 24a branches so as to extend from an intermediate portion the extension direction of one side portion of the first sheet-shaped portion 22 toward the outside of one side of the first sheet-shaped portion 22. The second sheet-shaped portion 24b branches so as to extend from an intermediate portion in the extension direction of the other side portion of the first sheet-shaped portion 22 to the outside of the other side of the first sheet-shaped portion 22. Here, the second sheet-shaped portions 24a and 24b are provided at different locations in the extension direction of the first sheet-shaped portion 22. More specifically, the second sheet-shaped portion 24a is provided at a position near one side of the first sheet-shaped portion and the second sheet-shaped portion 24b is provided at a position near another side of the first sheet-shaped portion 22. If multiple second sheet-shaped portions are provided, two of the second sheet-shaped portions may also be provided at the same position in the extension direction of the first sheet-shaped portion. Also, the second sheet-shaped portions 24a and 24b extend in an orientation that is orthogonal to the extension direction of the first sheet-shaped portion 22. The second sheet-shaped portions may also extend in an oblique direction with respect to the extension direction of the first sheet-shaped portion. There may also be 1 or 3 or more second sheet-shaped portions.

For the sake of convenience, the multiple wires 30 are distinguished as wires 30a, 30b, 30c, 30d, 30e, and 30f in some cases. The multiple wires 30a, 30b, 30c, 30d, 30e, and 30f are fixed to the first sheet-shaped portion 22 in an aligned state on one end side of the first sheet-shaped portion 22. The multiple wires 30a, 30b, 30e, 30d, 30e, and 30f are connected to a connector 40A at one end portion of the first sheet-shaped portion 22. The connector 40A is constituted such that terminals are stored in a housing in a predetermined alignment sequence. The alignment of the multiple wires 30a, 30b, 30c, 30d, 30e, and 30f is determined according to the alignment in which the terminals connected to the multiple wires 30a, 30b, 30c, 30d, 30e, and 30f are stored in the housing. The connector 40A may also be fixed to the sheet-shaped member 20. The end portions of the wires 30a, 30b, 30c, 30d, 30e, and 30f may also extend from the sheet-shaped member 20 and be connected to the connector 40A. The same applies to the other connectors 40B, 40C, and 40D as well.

Some wires 30d and 30f bend from the original portions at an intermediate location and branch with respect to the other wires 30a, 30b, 30c, and 30e at an intermediate portion in the extension direction of the first sheet-shaped portion 22. Some wires 30d and 30f extend in orientations that branch and are orthogonal with respect to the other wires 30a, 30b, 30c, and 30e. If the bend radii of the wires 30d and 30f are about the same as or smaller than the interval of the wires 30a, 30b, 30c, 30d, 30e, and 30f, the wires 30d and 30f and the wires 30a, 30b, and 30c intersect on their respective linear extensions. The bend radii of the wires 30d and 30f may also be greater than the interval of the wires 30a, 30b, 30c, 30d, 30e, and 30f. In this case, the wires 30d and 30f intersect the wires 30a, 30b, and 30c at positions away from the linear extensions. Due to the fact that the wires 30d and 30f are orthogonal to the wires 30a, 30b, and 30c, it is possible to narrow the distribution range of intersection locations 38a in the extension direction of the first sheet-shaped portion 22. For the other intersection locations as well, it is possible to narrow the distribution range of the intersection locations by using a configuration in which the wires intersect orthogonally in a similar manner. Here, the locations at which the wire 30d intersects the other wires 30a, 30b, and 30c are intersection locations 38a. Also, the locations at which the wire 30f intersects the other wires 30a, 30b, 30c, 30e, and 30f are intersection locations 38b. The intersection locations 38a and 38b are examples of locations at which a portion of the plurality of linear transmission members intersect so as to branch with respect to the other linear transmission members.

The wires 30d and 30f branch with respect to the other wires 30a, 30b, 30c, and 30e on the first sheet-shaped portion 22, extend toward the second sheet-shaped portion 24a, and are fixed in an aligned state on the second sheet-shaped portion 24a. The wires 30d and 30f are connected to the connector 40B at the end portion of the second sheet-shaped portion 24a. The alignment sequence of the wires 30d and 30f is also determined according to the arrangement in which the terminals connected to the end portions of the wires 30d and 30f are stored in the connector 40B.

Some wires 30a and 30b are bent from the original portions at an intermediate portion and branch with respect to the other wires 30c and 30e at an intermediate portion in the extension direction of the first sheet-shaped portion 22, which is a position shifted toward the other end side of the first sheet-shaped portion 22 relative to the above-described wires 30d and 30f. Some wires 30a and 30b extend in an orientation of branching and being orthogonal with respect to the other wires 30c and 30e. Similarly to the description above, the bend radii of the wires 30a and 30h may be the same as, smaller than, or greater than the interval of the wires 30a, 30b, 30c, 30d, 30e, and 30f. Here, the locations at which the wire 30a intersects the other wires 30c and 30e are intersection locations 38c. Also, the locations at which the wire 30b intersects the other wires 30c and 30e are intersection locations 38d. The intersection locations 38c and 38d are examples of locations at which a portion of the plurality of linear transmission members intersect so as to branch with respect to the other linear transmission members.

The wires 30a and 30b branch with respect to the other wires 30c and 30e on the first sheet-shaped portion 22, extend toward the second sheet-shaped portion 24b, and are fixed in an aligned state on the second sheet-shaped portion 24b. The wires 30a and 30b are connected to the connector 40C at the end portion of the second sheet-shaped portion 24b. The alignment sequence of the wires 30a and 30b is also determined according to the arrangement in which terminals to be connected to the end portions of the wires 30a and 30b are stored in the connector 40C.

The remaining wires 30c and 30e extend toward the other end portion of the first sheet-shaped portion 22. The alignment sequence of the wires 30e and 30e at the other end portion of the first sheet-shaped portion 22 is determined according to the arrangement in which terminals to be connected to the end portions of the wires 30a and 30b are stored in the connector 40). Here, the alignment sequence of the wires 30c and 30e at the other end portion of the first sheet-shaped portion 22 and the alignment sequence of the wires 30c and 30e at the one end portion of the first sheet-shaped portion 22 differ from each other according to the storage positions of the terminals in the connectors 40A and 40D. In view of this, the wire 30e bends at an intermediate portion and intersects the wire 30c so as to change the alignment sequence of the multiple wires 30c and 30e. Here, near the intersection locations 38c and 38d, the wire 30e is bent so as to intersect the wire 30c and extends parallel to the wire 30c at a position near the other end portion of the first sheet-shaped portion 22. Here, the wire 30e intersects the wire 30c in an orthogonal orientation, and the portions on both sides of the wire 30e that intersect the wire 30c extend in a parallel orientation with respect to the wire 30c. The portions between the portion of the wire 30e that intersects the wire 30c and the portions of the wire 30e that extend parallel to the wire 30c are bent curvilinearly. Similarly to the above description, the bend radii may be the same as, smaller than, or greater than the interval of the wires 30a, 30b, 30c, 30d, 30e, and 30f. The intersection location of the wire 30c and the wire 30e is an example of a location at which the wire 30c and the wire 30e intersect each other such that the alignment sequence of the wires 30c and 30e is changed. The wires 30c and 30e are fixed in an aligned state on the other end portion of the first sheet-shaped portion 22. The wires 30c and 30e are connected to the connector 40D at the other end portion of the first sheet-shaped portion 22.

The above-described intersection locations 38a, 38b, 38c, 38d, and 39 are located at only the branching portions. The branching portions in the wiring member are portions at which some of the multiple wires branch from the other wires. Here, the intersection locations 38a, 38b, 38c, 38d, and 39 are located at only the branching portions in order to avoid a case in which the intersection locations 38a, 38b, 38c, 38d, and 39 are folded when the wiring member 10 is made into a compact form by folding during packaging, transport, or the like. That is, although the multiple wires 30 are fixed to the sheet-shaped member 20, if the multiple wires 30 intersect, there is a risk that the holding strength will decrease for the wires 30 located on the upper side apart from the sheet-shaped member 20. For this reason, there is a risk that the paths of the wires will be disturbed on the sheet-shaped member 20, or the wires 30 will separate from the sheet-shaped member 20 when the wiring member 10 is folded at the intersection locations 38a, 38b, 38c, 38d, and 39. In view of this, due to the intersection locations 38a, 38b, 38c, 38d, and 39 being located at only the branching portions, a case is avoided in which the wiring member 10 is folded at the intersection locations 38a, 38b, 38c, 38d, and 39 during packaging, transport, or the like.

In this regard, in one example, the branching portions 50A and 50B may also be understood to be regions extending, from the second sheet-shaped portions 24a and 24b to the first sheet-shaped portion 22. If the first sheet-shaped portion 22 is folded at the region in which the second sheet-shaped portions 24a and 24b are present, it will be necessary to fold the second sheet-shaped portions 24a and 24b, the folding task will be troublesome, and the folded form will not be stable either. For this reason, even if the wiring member 10 is folded, normally, it is possible to avoid folding at the region in which the second sheet-shaped portions 24a and 24b are present.

Here, the second sheet-shaped portion 24a branches from one side of the first, sheet-shaped portion 22. The quadrangular region surrounded by a pair of lines 50La obtained by extending both side edges of the second sheet-shaped portion 24a to the first sheet-shaped portion 22 and both side edges of the first sheet-shaped portion 22 may be understood as the branching portion 50A. Also, the second sheet-shaped portion 24b branches from the other side of the first sheet-shaped portion 22. The quadrangular region surrounded by a pair of lines 50Lb obtained by extending both side edges of the second sheet-shaped portion 24b to the first sheet-shaped portion 22 and both side edges of the first sheet-shaped portion 22 may be understood as the branching portion 50B. The intersection locations 38a and 38b are located in the branching portion 50A and the intersection locations 38c, 38d, and 39 are located in the branching portion 50B.

Note that the mode by which the wires 30 and the sheet-shaped member 20 are fixed to each other may be contact site fixing, non-contact site fixing, or both. Here, in contact site fixing, the portions at which the wires 30 and the sheet-shaped member 20 are in contact with each other are fixed by sticking together. Also, non-contact site fixing is a fixing mode that is not contact site fixing. For example, a thread, another sheet member, adhesive tape, or the like presses the wires 30 into the sheet-shaped member 20, a thread, another sheet member, adhesive tape, or the like sandwich the wires 30 and the sheet-shaped member 20 in a state of surrounding the wires 30 and the sheet-shaped member 20 or the like, and thus the wires 30 and the sheet-shaped member 20 are kept in the state of being fixed to each other. In the present example, it is envisioned that the wires 30 and the sheet-shaped member 20 are in a state of contact site fixing. The descriptions relating to contact site fixing can also be applied to non-contact site fixing as long as it is not a configuration to which contact site fixing cannot be applied.

As the mode of contact site fixing, contact site indirect fixing may be used, contact site direct fixing may be used, or both may be used in different regions. Here, in contact site indirect fixing, the wires 30 and the sheet-shaped member 20 are fixed to each other by sticking together indirectly via an intervening member such as an adhesive, a pressure sensitive adhesive, or double-sided adhesive tape provided therebetween. Also, in contact site direct fixing, the wires 30 and the sheet-shaped member 20 are fixed to each other by sticking together directly without use of a separately-provided adhesive or the like. In contact site direct fixing, for example, it is conceivable that the wires 30 and the sheet-shaped member 20 are fixed by sticking together due to resin included in at least one of the wires 30 and the sheet-shaped member 20 being melted. Hereinafter, the wires 30 and the sheet-shaped member 20 will be described as being in a state of contact site direct fixing. The descriptions relating to contact site direct fixing can be applied also to contact site indirect fixing, as long as it is not a configuration to which contact site direct fixing cannot be applied.

When the state of contact site direct fixing is formed, it is also conceivable that the resin is melted by heat, or is melted using a solvent. That is, the state of contact site direct fixing may also be a state of contact site direct fixing achieved through heat, or may be a state of contact site direct fixing achieved using a solvent. It is preferable that the state is the state of contact site direct fixing achieved through heat.

There is no particular limitation on the configuration of forming the state of contact site direct fixing at this time, and various types of configurations including known configurations such as welding, fusion, and fusion welding can be used. For example, if the state of contact site direct fixing achieved through heat is formed through welding, it is possible to use various welding configurations, such as ultrasonic welding, pressurized heat welding, hot-air welding, and high-frequency welding. When the state of contact site direct fixing is formed through these configurations, the wires 30 and the sheet-shaped member 20 are put in a state of contact site direct fixing achieved through the configuration. Specifically, for example, when the state of contact site direct fixing is formed through ultrasonic welding, the wires 30 and the sheet-shaped member 20 are put in a state of contact site direct fixing achieved through ultrasonic welding. The portions (fixed portions of the wires 30 and the sheet-shaped members 20) obtained by forming the state of contact site direct fixing achieved through heat through welding may also be referred to as welded portions, and among them, a fixed portion achieved through ultrasonic welding may be referred to as an ultrasonic-welded portion, a fixed portion achieved through pressurized heat welding may be referred to as a pressurized-heat-welded portion, and the like.

In the case of contact site direct fixing, only the resin included in the coverings of the wires 30 may be melted, or only the resin included in the sheet-shaped member 20 may be melted. In these cases, a state is entered in which the melted resin sticks to the other outer surface, and a relatively distinct interface is formed in some cases. Also, in the case of contact site direct fixing, both the resin included in the covering of the wires 30 and the resin included in the sheet-shaped member 20 may be melted. In this case, both resins mix together and a distinct interface is not formed in some cases. In particular, if the covering of the wires 30 and the sheet-shaped member 20 include resin that is easily compatibilized, such as the same resin materials, or the like, both resins mix together and a distinct interface is not formed in some cases.

The wiring member 10 formed in this manner is folded at a position away from the branching portions 50A and 50B.

For example, as shown in FIG. 2, the wiring member 10 is folded at a position near one end side of the first sheet-shaped portion 22 with respect to the branching portion 50A. Note that the folding need only be performed to such a degree that the wiring member 10 can be overlapped.

According to the wiring member 10 formed as described above, in the wiring member 10, normally, folding is performed at a position away from the branching portions 50A and 50B, and packaging, transport, and the like are performed. In view of this, by using a configuration in which the intersection locations 38*a*, 38*b*, 38*c*, 38*d*, and 39 of the wires 30 are located at only the branching portions 50A and 50B, a case is suppressed in which the paths of the wires 30 are disturbed on the sheet-shaped member 20 or the wires 30 separate from the sheet-shaped member 20 when the wiring member 10 obtained by fixing the wires 30 to the sheet-shaped member 20 is folded.

Also, due to the intersection locations 38*a*, 38*b*, 38*c*, and 38*d* at which a portion of the multiple wires 30 intersect so as to branch with respect to the other wires being located at the branching portions 50A and 50B, a case is suppressed in which the paths of the wires 30 are disturbed on the sheet-shaped member 20 and the wires 30 separate from the sheet-shaped member 20 when the wiring member 10 is folded.

Also, the intersection locations 39 at which some of the multiple wires 30 intersect the other wires 30 such that the alignment sequence of the multiple wires 30 (here, wires 30*c* and 30*e*) is changed are located at the branching portion 50B, and thereby a case is prevented in which the paths of the wires 30 are disturbed on the sheet-shaped member 20 or the wires 30 separate from the sheet-shaped member 20 when the wiring member 10 is folded. If this configuration is used, even if the other intersection locations 38*a*, 38*b*, 38*c*, and 38*d* are located outside of the branching portions 50A and 50B, it is possible to suppress a case in which the paths of the wires 30 are disturbed on the sheet-shaped member 20 or the wires 30 separate from the sheet-shaped member 20 at the intersection location for changing the alignment sequence. Accordingly, the present specification discloses a wiring member including: a sheet-shaped member; and a plurality of linear transmission members fixed on the sheet-shaped member, in which a portion of the plurality of linear transmission members is fixed on the sheet-shaped member so as to branch with respect to another said linear transmission member at a branching portion, and a location at which a portion of the plurality of linear transmission members intersects another said linear transmission member such that an alignment sequence of the plurality of linear transmission members is changed is located at the branching portion.

Also, if the second sheet-shaped portions 24*a* and 24*b* branch from the first sheet-shaped portion 22, normally, the number of bending locations of the sheet-shaped member 20 is reduced, and therefore the first sheet-shaped portion 22 is bent at a position away from the second sheet-shaped portions 24*a* and 24*b*. In view of this, if it is assumed that the branching portions 50A and 50B are regions extending from the second sheet-shaped portions 24*a* and 24*b* to the first sheet-shaped portion 22, a case is suppressed in which the paths of the wires 30 are disturbed on the sheet-shaped member 20 or the wires 30 separate from the sheet-shaped member 20 when the wiring member 10 is folded.

Variations

Various variations will be described premised on the above-described embodiment.

Figure 3:
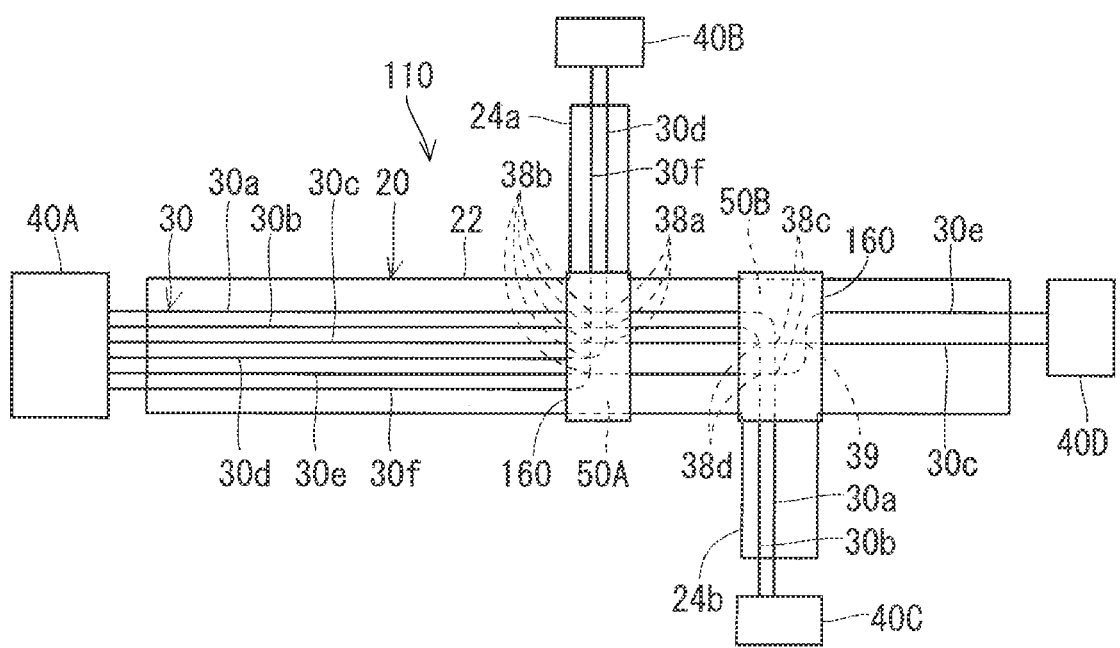
FIG. 3 is an overall plan view showing a wiring member according to a first variation.

FIG. 3 is an overall plan view showing a wiring member 110 according to a first variation. The wiring member 110 further includes covers 160 that cover the branching portions 50A and 50B. Here, the cover 160 that covers the branching portion 50A is larger than the branching portion 50A, and accordingly covers the entirety of the branching portion 50A. Also, the cover 160 that covers the branching portion 50B is larger than the branching portion 50B, and accordingly, covers the entirety of the branching portion 50B. The covers 160 do not need to cover the entireties of the branching portions 50A and 50B, and need only cover at least the intersection locations 38*a*, 38*b*, 38*c*, 38*d*, and 39.

For example, resin sheets of PVC, PE, PET, PP, PA, or the like may be used as the covers 160, or metal sheets of aluminum, copper, or the like may be used as the covers 160. Also, the covers 160 may be fiber materials such as a woven fabric, a knitted fabric, or a nonwoven fabric, or may be molded materials such as a member obtained through extrusion molding or injection molding. Also, the covers 160 may be foam materials that are foam-molded, or may be solid materials that are uniformly solid without being foam molded. The covers 160 may also have only one layer, or may have multiple layers.

The fixing of the cover 160 to the sheet-shaped member 20 may be performed using any configuration. For example, the cover 160 may also be fixed to the sheet-shaped member 20 at a lateral region of the main surface of the sheet-shaped member 20 away from the paths of the wires 30. Also, the cover 160 may be fixed to the sheet-shaped member 20 on the entire main surface of the sheet-shaped member 20.

A configuration that is the same as that in which the wires 30 are fixed to the sheet-shaped member 20 can be employed as the fixing mode of the cover 160 and the sheet-shaped member 20. That is, the fixing mode of both members may be contact site fixing, non-contact site fixing, or both. Also, as the mode of contact site fixing, contact site indirect fixing may be used, contact site direct fixing may be used, or both may be used in different regions. For example, the cover 160 can be fixed to the sheet-shaped member 20 through ultrasonic welding, pressurized heat welding, hot-air welding, high-frequency welding, or the like.

With this variation, the intersection locations 38*a*, 38*b*, 38*c*, 38*d*, and 39 located at the branching portions 50A and 50B are covered by the covers 160. For this reason, due to the covers 160, the wires 30 are less likely to separate from the sheet-shaped member 20, and a case is further suppressed in which the paths of the wires 30 are disturbed on the sheet-shaped member 20 or the wires 30 separate from the sheet-shaped member 20. Also, since rigidity is provided to the sheet-shaped member 20 by the covers 160, it is more difficult to fold at the portions of the sheet-shaped member 20 at which the covers 160 are provided. For this reason, the wiring member 110 is more difficult to bend at the portions at which the covers 160 are provided, that is, at the branching portions 50A and 50B, and from this viewpoint as well, a case is suppressed in which the paths of the wires 30 are disturbed on the sheet-shaped member 20 or the wires 30 separate from the sheet-shaped member 20.

In the present variation, if multiple branching portions 50A and 50B are provided, the covers 160 may also be provided only on a portion thereof.

Figure 4:
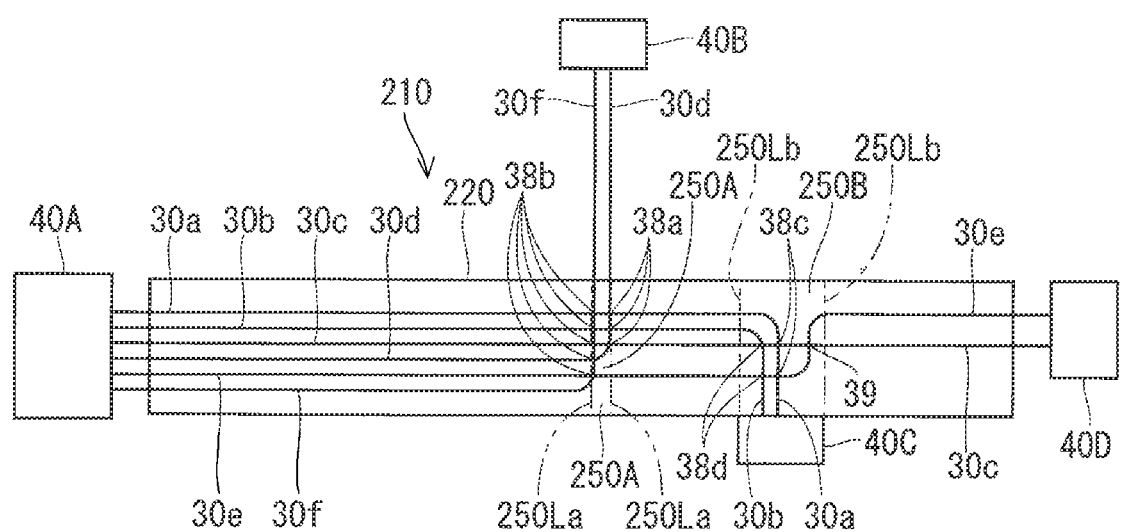
FIG. 4 is an overall plan view showing a wiring member according to a second variation.

FIG. 4 is an overall plan view showing a wiring member 210 according to a second variation. In this wiring member 210, the sheet-shaped member 220 corresponding to the sheet-shaped member 20 does not have the second sheet-shaped portions 24*a* and 24*b*. That is, the sheet-shaped member 220 is formed into a shape that does not branch overall and extends in one line, and here, is formed into a band shape that is elongated and extends straight.

The multiple wires 30a, 30b, 30c, 30d, 30e, and 30f are fixed along the same paths as in the above-described embodiment on the sheet-shaped member 220.

That is, some of the wires 30d and 30f branch with respect to the other wires 30a, 30b, 30c, and 30e at an intermediate portion in the extension direction of the sheet-shaped member 220. Some wires 30d and 30f extend in an orientation of branching and being orthogonal with respect to the other wires 30a, 30b, 30c, and 30e.

The wires 30d and 30f branch with respect to the other wires 30a, 30b, 30c, and 30e on the sheet-shaped member 220 and extend outward from one side of the sheet-shaped member 220. Due to the fact that the second sheet-shaped portion 24a is not present, unlike the above-described embodiment, the wires 30d and 30f extend outward without being restricted by a sheet-shaped member. This portion may be covered with an outer covering material such as adhesive tape.

In this case, the branching portion 250A may also be understood as the region extending from the branching wires 30d and 30f to the sheet-shaped member 220. That is, if the multiple wires 30d and 30f branch, the quadrangular region surrounded by the pair of lines 250La obtained by extending the wires 30d and 30f on both sides in the alignment direction toward the sheet-shaped member 220 and both side edges of the sheet-shaped member 220 may be understood as the branching portion 250A.

When the wiring member 210 is put into a compact form by being folded during packaging, shipping, and the like, normally, the folding of the branched portions of the branching wires 30d and 30f is suppressed, and therefore the sheet-shaped member 220 is folded at a position away from the branched portions of the branching wires 30d and 30f. For this reason, if the branching portion 250A includes a region extending from the branching wires 30d and 30f to the sheet-shaped member 220, it is possible to suppress a case in which the sheet-shaped member 220 is folded at the intersection locations 38a and 38b of the multiple wires 30 when the sheet-shaped member 220 is folded. Accordingly, a case is suppressed in which the paths of the wires 30 are disturbed on the sheet-shaped member 20 or the wires 30 separate from the sheet-shaped member 20 when the wiring member 10 is folded.

Note that if there is one branching wire, the intersection location of the branching wire and the other wires need only be present on the extension of the branching wire. Also, if there are three or more branching wires, it is sufficient that a range surrounded on the linear extensions of the wires on both sides in the alignment direction of the multiple branching wires is used as the branching portion and the intersection locations are present within that range. The intersection locations for changing the alignment sequence of the wires may also be present at such a branching portion.

Also, some wires 30a and 30b branch with respect to the other wires 30c and 30e at an intermediate portion in the extension direction of the sheet-shaped member 220, which is a position shifted toward the other end side of the sheet-shaped member 220 relative to the above-described wires 30d and 30f. Some wires 30a and 30b extend in an orientation of branching and being orthogonal to the other wires 30c and 30e.

The wires 30a and 30b branch with respect to the other wires 30c and 30e on the sheet-shaped member 220, extend toward the other side of the sheet-shaped member 220, and are fixed in an aligned state on the sheet-shaped member 220. The connector 40C is provided on the edge portion on the other side of the sheet-shaped member 220. The connector 40C may or may not be fixed to the edge portion of the sheet-shaped member 220. The connector 40C may be arranged overlapping the edge portion of the sheet-shaped member 220 and may be arranged away from the edge portion of the sheet-shaped member 220. The connector 40C need only be arranged along the edge portion of the sheet-shaped member 220 at a closeness of such a degree that folding of the sheet-shaped member 220 is hampered. The wires 30a and 30b are connected to this kind of connector 40C.

In this case, a branching portion 250B is a region of the sheet-shaped member 220 that corresponds to the connector 40C. That is, due to the fact that the connector 40C is arranged along the other edge portion of the sheet-shaped member 220, the quadrangular region surrounded by the pair of tines 250Lb obtained by extending the edge portions on both sides of the connector 40C toward the sheet-shaped member 220 and both side edges of the sheet-shaped member 220 may be understood as the branching portion 250B.

In this manner, if some wires 30a and 30b of the multiple wires 30 branch with respect to the other wires 30c and 30e on the sheet-shaped member 20 and are connected to the connector 40C provided on the side edge of the sheet-shaped member 320, normally, the wiring member 210 is folded at a position away from the connector 40C. For this reason, if the branching portion 250B includes the region of the sheet-shaped member 220 that corresponds to the connector 40C, it is possible to suppress a case in which the sheet-shaped member 220 is folded at the intersection locations 38c and 38d of the multiple wires 30 when the sheet-shaped member 220 is folded.

Also, the intersection location 39 at which some of the multiple wires 30 intersect the other wires 30 such that the alignment sequence of the multiple wires 30 (here, wires 30c and 30O is changed is located at the branching portion 250B, and thereby a case is prevented in which the paths of the wires 30 are disturbed on the sheet-shaped member 20 or the wires 30 separate from the sheet-shaped member 20 for this kind of intersection location 39 as well.

FIG. 5 is an overall plan view showing a wiring member 310 according to a third variation. With this wiring member 310, a second sheet-shaped portion 324 of a sheet-shaped member 320 branches and extends from one side portion of a long and narrow first sheet-shaped portion 322. The second sheet-shaped portion 324 extends obliquely with respect to the first sheet-shaped portion 322.

Some wires 330b and 330c of the multiple wires 330a, 330b, and 330c branch from the other wire 330a at an intermediate portion in the extension direction of the first sheet-shaped portion 322. Some wires 330b and 330c intersect and branch with respect to the other wire 330a at the intersection locations 338a and 338b, extend on the second sheet-shaped portion 324, and are fixed to the second sheet-shaped portion 324. Here, the intersection locations 338a and 338b are located at the intersection locations of the linear extended lines of the wires 330b and 330c and the linear extended line of the wire 330a. The wires 330a, 330b, and 330c are connected to the connector 340 as appropriate at the end portion of the first sheet-shaped portion 322 and the end portion of the second sheet-shaped portion 324.

In this case, similarly to the above-described embodiment, regarding the branching portion 350A, the quadrangular (here, parallelogram-shaped) region surrounded by the pair of lines 350La obtained by extending both side edges of the second sheet-shaped portion 324 to the first sheet-shaped portion 322 and both side edges of the first sheet-shaped portion 322 may be understood as the branching portion 350A. The above-described intersection locations 338*a* and 338*b* are located at the branching portion 350A.

The location at which a portion of the multiple wires intersects another wire such that the alignment sequence of the multiple wires is changed may also be located at the branching portion 350A.

In this wiring member 310 as well, it is conceivable that it is possible to avoid a case in which folding is performed near the branching portion 350A, and therefore a case is suppressed in which the paths of the wires 330*a*, 330*b*, and 330*c* are disturbed on the sheet-shaped member 320 or the wires 330*a*, 330*b*, and 330*c* separate from the sheet-shaped member 320.

Figure 6:
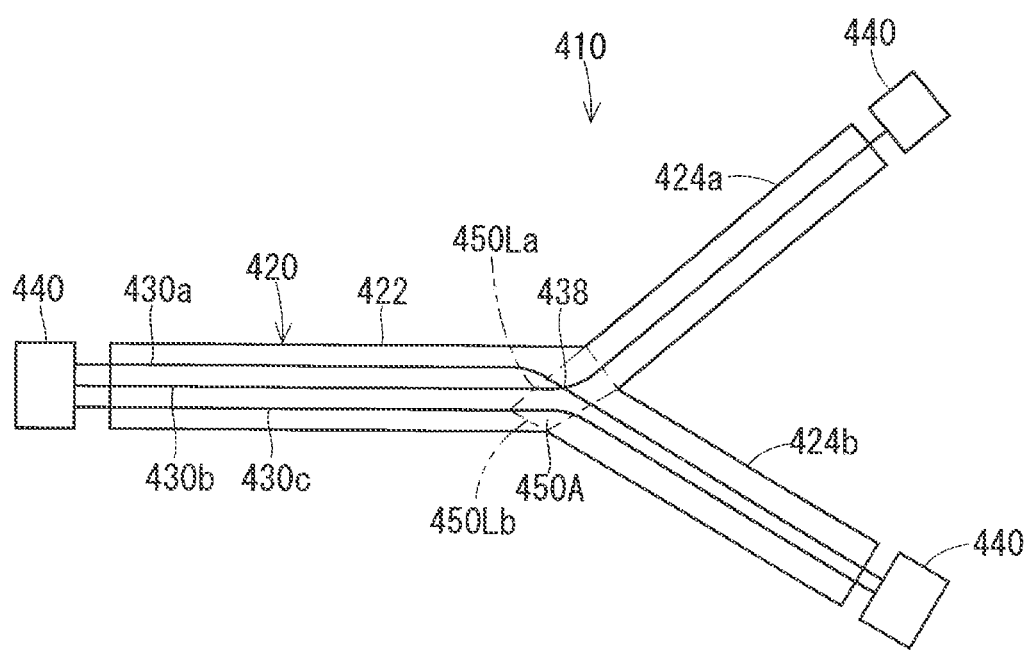
FIG. 6 is an overall plan view showing a wiring member according to a fourth variation.

FIG. 6 is an overall plan view showing a wiring member 410 according to a fourth variation. With this wiring member 410, the sheet-shaped member 420 includes a long and narrow first sheet-shaped portion 422 and multiple (here, two) second sheet-shaped portions 424*a* and 424*b* that, branch from the first sheet-shaped portion 422. The second sheet-shaped portions 424*a* and 424*b* extend obliquely with respect to the first sheet-shaped portion 422 from an end portion of the first sheet-shaped portion 422.

The multiple wires 430*a*, 430*b*, and 430*c* are fixed in an aligned state with respect to the first sheet-shaped portion 422. The multiple wires 430*a*, 430*b*, and 430*c* branch in two directions at the end portion of the first sheet-shaped portion 422. That is, the wire 430*b* bends with respect to the original portion at an intermediate location and branches with respect to the other wires 430*a* and 430*c*. The wire 430*b* is fixed on the second sheet-shaped portion 424*a*. The wires 430*a* and 430*c* bend at an intermediate location with respect to the original portion and branch with respect to the other wire 430*b*. The wires 430*a* and 430*c* are fixed in an aligned state on the second sheet-shaped portion 424*b*. For this reason, the wire 430*a* intersects the wire 430*b* and the intersection location is an intersection location 438.

The wires 430*a*, 430*b*, and 430*c* are connected to connectors 440 as appropriate at the end portion of the first sheet-shaped portion 422 and the end portions of the second sheet-shaped portions 424*a* and 424*b*.

In this case, the branching portion 450A may be understood to be a region surrounded by a line 450La obtained by extending the edge on the far side from the second sheet-shaped portion 424*b* among the two side edges of the second sheet-shaped portion 424*a* to the first sheet-shaped portion 422, and a pair of lines 450Lb obtained by extending the edge on the far side from the second sheet-shaped portion 424*a* among the two side edges of the second sheet-shaped portion 424*b* toward the first sheet-shaped portion 422. The above-described intersection location 438 is located at the branching portion 450A.

In this wiring member 410 as well, it is conceivable that it is possible to avoid a case in which folding is performed near the branching portion 450A, and therefore a case is suppressed in which the paths of the wires 430*a*, 430*b*, and 430*c* are disturbed on the sheet-shaped member 420 or the wires 430*a*, 430*b*, and 430*e* separate from the sheet-shaped member 420.

The configuration is not limited to those in the embodiment and each variation described above, however, it is sufficient that the wiring member includes: a sheet-shaped member; and a plurality of linear transmission members fixed on the sheet-shaped member, in which the plurality of linear transmission members are fixed on the sheet-shaped member such that a portion of the plurality of linear transmission members branches with respect to the other linear transmission members at a branching portion, and an intersection location of the plurality of linear transmission members is located at the branching portion. The reason is that if the intersection location of the plurality of linear transmission members is located at the branching portion, a case is suppressed in which the paths of the linear transmission members are disturbed on the sheet-shaped member or the linear transmission members separate from the sheet-shaped member when the wiring member is folded at that portion.

In a wiring member 510 according to a fifth variation in FIG. 7, wires 530*a*, 530*b*, 530*c*, 530*d*, 530*e*, and 530*f* are connected to the sheet-shaped member 20 as with the plurality of wires 30*a*, 30*b*, 30*e*, 30*d*, 30*e*, and 30*f* in the embodiment, and connect the connectors 40A, 40B, 40C, and 40D.

The present wiring member 510 is different from the wiring member 10 according to the embodiment in that it includes a location 539*b* at which the wire 530*f* intersects the other wires 530*b*, 530*c*, 530*d*, 530*e*, and 530*f* and a location 539 at which the wire 530*e* intersects the other wire 530*c*.

In the manner similar to the embodiment 1 described above, some wires 530*d* and 530*f* branch with respect to the other wires 530*a*, 530*b*, 530*e*, and 530*e* at an intermediate portion. Some wire 530*d* bends at right angle and then extends straight as it is, thereby branching with respect to the other wires 530*a*, 530*b*, and 530*c*. Locations at which the wire 530*d* intersects the wires 530*a*, 530*b*, and 530*c* are intersection locations 38*a*. The intersection locations 38*a* are examples of locations at which a portion of the plurality of linear transmission members intersect so as to branch with respect to the other linear transmission members. The above-described intersection locations 38*a* are located at the branching portion 50A in the manner similar to the embodiment 1.

Some wires 530*f* bend between the end portion of the sheet-shaped member 20 and the branching portion 50A, and intersect the other wires 530*a*, 530*b*, 530*c*, 530*d*, and 530*e* at the intersection locations 539*b*. The wires 530*f* are arranged in parallel to the wires 530*a*, 530*b*, 530*c*, 530*d*, and 530*e* before and after the intersection locations 539*b*. However, the alignment sequence of the wires 530*f* with respect to the wires 530*a*, 530*b*, 530*c*, 530*d*, and 530*e* differ from each other before and after the intersection locations 539*b*. Thus, the intersection locations 539*b* are locations at which a portion of the plurality of linear transmission members intersects the other linear transmission members to change the alignment sequence of the plurality of linear transmission members. The intersection locations 539*b* are located in a portion of the sheet-shaped member 20 away from the branching portions 50A and 50B.

Some wires 530*a* and 530*b* bend from the original portions at an intermediate location and branch with respect to the other wires 530*c* and 530*e* in the manner similar to the embodiment 1. Locations at which the wire 530*a* intersects the wires 530*c* and 530*e* are intersection locations 380. Locations at which the wire 530*b* intersects the other wires 530*c* and 530*e* are intersection locations 38*d*. The intersection locations 38*c* and 38*d* are examples of locations at which a portion of the plurality of linear transmission members intersect so as to branch with respect to the other linear transmission members. The intersection locations 38*c* and 38*d* are located at the branching portion 50B.

The wires 530*c* and 530*e* extend toward the other end portion of the sheet-shaped member 20. The alignment sequence of the wires 530*c* and 530*e* at one end portion and the other end portion differ from each other in the manner similar to the embodiment 1. Thus, the wire 530*e* bends at the intermediate location and intersects the wire 530*c* to change the alignment sequence of the plurality of wires 530c and 530e. Herein, the wire 530e bends between the other end portion of the sheet-shaped member 20 and the branching portion 50B, and intersects the wire 530c at the intersection location 539b. The wires 530e are arranged in parallel to the wire 530c before and after the intersection location 539. However, the alignment sequence of the wires 530c and 530e differs before and after the intersection location 539. Thus, the intersection location 539 is a portion at which a portion of the plurality of linear transmission members intersects the other linear transmission members to change the alignment sequence of the plurality of linear transmission members. The intersection location 539 is located on a portion of the sheet-shaped member 20 away from the branching portions 50A and 50B.

As the present variation, even in a case where some intersection locations 38a, 38e, and 38d in the plurality of intersection locations of the plurality of linear transmission members are located in the branching portions 50A and 50B, and the other some intersection locations 539b and 539 are located away from the branching portions 50A and 50B, a case is prevented in which the paths of the wires 530a, 530b, 530c, 530d, 530e, and 530f are disturbed on the sheet-shaped member 20 or the wires 530a, 530b, 530c, 530d, 530e, and 530f separate from the sheet-shaped member 20 when the wiring member 510 is folded. The reason is that in the wiring member 10, normally, folding is performed at a position away from the branching portions 50A and 50B, and packaging, transport, and the like are performed, thus a case is prevented in which the paths of the wires 530a, 530b, 530c, 530d, 530e, and 530f are disturbed in the intersection locations 38a, 38c, and 38d located in the branching portions 50A and 50B and the wires 530a, 530b, 530c, 530d, 530e, and 530f separate from the sheet-shaped member 20.

The intersection locations 38a, 38c, and 38d and the intersection locations 539b and 539 are dispersed in a larger region, thus the intersection locations of the wires are hardly concentrated in a small region. Accordingly, the wires 530a, 530b, 530c, 530d, 530e, and 530f hardly separate from the sheet-shaped member 20, and a catch and fluttering of the wires 530a, 530b, 530c, 530d, 530e, and 530f, for example, is suppressed.

Note that the configurations described in the embodiment and variations above can be combined as appropriate as long as no discrepancy occurs. For example, a second sheet-shaped portion that intersects and branches with respect to the first sheet-shaped portion and a second sheet-shaped portion that branches obliquely may both be included in one wiring member. Also, a connector may be provided by being added to the side edge of the first sheet-shaped portion in the wiring member 10.

Although the invention was described in detail above, the above description is in all aspects exemplary; and the invention is not limited thereto.

It is understood that countless variations that have not been described as examples can be envisioned without departing from the scope of the invention.

LIST OF REFERENCE NUMERALS

10; 110; 210; 310; 410 Wiring member
20; 220; 320; 420 Sheet-shaped member
22; 322; 422 First sheet-shaped portion
24a, 24b; 324; 424a, 424b Second sheet-shaped portion
30, 30a, 30b, 30c, 30d, 30e, 30f; 330a, 330b, 330c; 430a, 430b, 430c Wire
38a, 38b, 38c, 38d, 39; 338a, 338b; 438 Intersection location
40C Connector
50A, 50B; 250A, 250B; 350A; 450A Intersection portion

The invention claimed is:

1. A wiring member comprising:
a sheet-shaped member;
a plurality of linear transmission members fixed on the sheet-shaped member by welding, wherein the plurality of linear transmission members are fixed on the sheet-shaped member such that a portion of the plurality of linear transmission members branches with respect to the other linear transmission members at a branching portion; and
a cover that covers the branching portion, wherein
the plurality of linear transmission members includes insulation covered wires each including an insulation covering and a core wire,
an intersection location of the insulation covered wires is located at the branching portion,
the intersection location includes a location at which a portion of the insulation covered wires intersects so as to branch with respect to another portion of said insulation covered wires, and so that the insulation covering and at least one core wire of the portion of the insulation covered wires intersect with the insulation covering and at least one core wire of the another portion of said insulation covered wires at the intersection, and
at least a portion of the insulation covered wires is exposed on one main surface of the sheet-shaped member.

2. The wiring member according to claim 1, wherein the intersection location of the insulation covered wires is located at only the branching portion.

3. The wiring member according to claim 1, wherein the intersection location includes a location at which a portion of the insulation covered wires intersects another portion of said insulation covered wires such that an alignment sequence of the insulation covered wires is changed.

4. The wiring member according to claim 1, wherein the sheet-shaped member includes a first sheet-shaped portion, and a second sheet-shaped portion that branches from the first sheet-shaped portion,
a portion of the insulation covered wires branches with respect to another portion of said insulation covered wires at the first sheet-shaped portion and is fixed on the second sheet-shaped portion, and
the branching portion includes a region extending from the second sheet-shaped portion to the first sheet-shaped portion.

5. The wiring member according to claim 1, wherein a portion of the insulation covered wires branches with respect to another portion of said insulation covered wires on the sheet-shaped member, and
the branching portion includes a region extending from the branching portion of said insulation covered wires to the sheet-shaped member.

6. The wiring member according to claim 1, further comprising
a cover that covers the branching portion.

7. A wiring member comprising:
a sheet-shaped member; and
a plurality of linear transmission members fixed on the sheet-shaped member by welding, wherein the plurality of linear transmission members are fixed on the sheet-shaped member such that a portion of the plurality of linear transmission members branches with respect to the other linear transmission members at a branching portion, an intersection location of the plurality of linear transmission members is located at the branching portion, a plurality of linear transmission members, which are a portion of the plurality of linear transmission members, branch with respect to another portion of said linear transmission members on the sheet-shaped member, and are connected to a connector provided on a side edge of the sheet-shaped member, the branching portion includes a region of the sheet-shaped member that corresponds to the connector, at least a portion of the plurality of liner transmission members is exposed on one main surface of the sheet-shaped member, the sheet-shaped member includes a first sheet-shaped portion, and a second sheet-shaped portion that branches from the first sheet-shaped portion, the first sheet-shaped portion extends longitudinally in a first direction, the second sheet-shaped portion extends longitudinally in a second direction, and the first and second directions are different directions that intersect with one another, a portion of the plurality of linear transmission members branches with respect to another portion of said linear transmission members at the first sheet-shaped portion and is fixed on the second sheet-shaped portion, and the branching portion includes a region extending from the second sheet-shaped portion to the first sheet-shaped portion.

8. The wiring member according to claim 7, wherein the intersection location of the plurality of linear transmission members is located at only the branching portion.

9. The wiring member according to claim 7, wherein the intersection location includes a location at which a portion of the plurality of linear transmission members intersects another portion of said linear transmission members such that an alignment sequence of the plurality of linear transmission members is changed.

10. The wiring member according to claim 7, wherein a portion of the plurality of linear transmission members branches with respect to another portion of said linear transmission members on the sheet-shaped member, and the branching portion includes a region extending from the branching portion of said linear transmission members to the sheet-shaped member.

11. The wiring member according to claim 7, further comprising a cover that covers the branching portion.

12. The wiring member according to claim 7, wherein the connector is fixed to an edge portion of the sheet-shaped member.

13. A wiring member comprising:
a sheet-shaped member; and
a plurality of linear transmission members fixed on the sheet-shaped member by welding, wherein the plurality of linear transmission members are fixed on the sheet-shaped member such that a portion of the plurality of linear transmission members branches with respect to the other linear transmission members at a branching portion, an intersection location of the plurality of linear transmission members is located at the branching portion, the intersection location includes a location at which a portion of the plurality of linear transmission members intersects so as to branch with respect to another portion of said linear transmission members, at least a portion of the plurality of liner transmission members is exposed on one main surface of the sheet-shaped member, the sheet-shaped member includes a first sheet-shaped portion, and a second sheet-shaped portion that branches from the first sheet-shaped portion, the first sheet-shaped portion extends longitudinally in a first direction, the second sheet-shaped portion extends longitudinally in a second direction, and the first and second directions are different directions that intersect with one another, a portion of the plurality of linear transmission members branches with respect to another portion of said linear transmission members at the first sheet-shaped portion and is fixed on the second sheet-shaped portion, and the branching portion includes a region extending from the second sheet-shaped portion to the first sheet-shaped portion.

14. The wiring member according to claim 13, wherein the sheet-shaped member further includes a third sheet-shaped portion, and the third sheet-shaped portion branches from the first sheet-shaped portion, the third sheet-shaped portion extends longitudinally in a third direction, and the first and third directions are different directions that intersect with one another, the second sheet-shaped portion and the third sheet-shaped portions branch out from opposing sides of the first sheet-shaped portion, a portion of the plurality of linear transmission members branches with respect to another portion of said linear transmission members at a second branching portion at the first sheet-shaped portion and is fixed on the third sheet-shaped portion, and the second branching portion includes a region extending from the third sheet-shaped portion to the first sheet-shaped portion.

15. The wiring member according to claim 14, wherein the sheet-shaped member and one or more of the plurality of linear transmission members are foldable at a position that is outside of the branching portion, and when the sheet-shaped member and the one or more of the plurality of linear transmission members are folded at the position, the plurality of linear transmission members remain fixed on the sheet-shaped member.

16. The wiring member according to claim 15, wherein when the sheet-shaped member and the one or more of the plurality of linear transmission members are folded at the position, a folded portion of the sheet-shaped member and the one or more of the plurality of linear transmission covers the branching portion and the second branching portion.

* * * * *